(12) United States Patent
Chau et al.

(10) Patent No.: US 8,386,691 B1
(45) Date of Patent: Feb. 26, 2013

(54) MULTIMEDIA STORAGE CARD SYSTEM

(75) Inventors: Cecilia Chau, Selangor (MY); Eng-Tien Ee, Kuala Lumpur (MY); Chien-Hui Lin, Chiayi County (TW); Hsiu-Chen Chuang, New Taipei (TW); Kaung-Yu Hung, Taoyuan County (TW); Guang-Lee Wu, Hsinchu (TW); Kok-Keong Lai, Kuala Lumpur (MY)

(73) Assignee: Key Asic Inc., Hsin-Chu (TW)

( * ) Notice: Subject to any disclaimer, the term of this patent is extended or adjusted under 35 U.S.C. 154(b) by 53 days.

(21) Appl. No.: 13/213,162

(22) Filed: Aug. 19, 2011

(51) Int. Cl.
*G06F 13/00* (2006.01)

(52) U.S. Cl. .................. 710/316; 711/115; 710/305

(58) Field of Classification Search .......... 710/316–317, 710/305–306; 711/115
See application file for complete search history.

(56) References Cited

U.S. PATENT DOCUMENTS

| | | | |
|---|---|---|---|
| 7,284,132 B2 * | 10/2007 | Nakabe et al. | 713/182 |
| 7,559,090 B2 * | 7/2009 | Takagi et al. | 726/27 |
| 8,225,010 B2 * | 7/2012 | Tsujii | 710/16 |
| 2009/0164675 A1 * | 6/2009 | Chen et al. | 710/64 |
| 2009/0240885 A1 * | 9/2009 | Adachi | 711/115 |
| 2009/0292876 A1 * | 11/2009 | Lu et al. | 711/115 |
| 2012/0210078 A1 * | 8/2012 | Horiguchi et al. | 711/154 |

* cited by examiner

*Primary Examiner* — Brian Misiura
*Assistant Examiner* — Kim Huynh
(74) *Attorney, Agent, or Firm* — Rosenberg, Klein & Lee

(57) ABSTRACT

A multimedia storage card system includes a memory card; a dynamic switch coupled electrically and communicatively to the memory card; a first accessor coupled electrically and communicatively to the dynamic switch for accessing to the memory card, thereby storing data into and retrieving data from the memory card; and a second accessor coupled electrically and communicatively to the dynamic switch. Upon receipt of a first access signal transmitted from the second accessor, the dynamic switch determines whether the first accessor is in an idle condition. Upon detecting the first accessor is in the idle condition, the dynamic switch is switched to and in communication link with the second accessor, thereby transmitting the first access signal to the memory card and enabling the second accessor to access the memory card in order to store data into and retrieving data from the memory card.

5 Claims, 5 Drawing Sheets

MULTIMEDIA STORAGE CARD SYSTEM

BACKGROUND OF THE INVENTION

1. Field of the Invention

The present invention relates to a multimedia storage card system, more particularly to a multimedia/secure digital (SD) storage card system provided with a dynamic switch.

2. Description of the Prior Art

A memory card or stick, is applied in an electronic device and plays an important role, such as it is applied in a digital camera such that after the user has taken a photograph with the digital camera, the image data is stored within the memory card.

Due to rapid advance in the electronic technology, since the consumer require multi functions, such as the user may sometimes want to transmit the recently-taken photo to a certain blog in the Internet, or into a computer set in order to add moving actions. For transmission of the photo image, the user must first of all stop the photo taking operation. Then, the memory card must be attached to the computer set, only then the photo image can be transmitted to a desired blog in the Internet.

In order to facilitate transmission of the photo image, the prior art digital camera or multi-function mobile phone is generally provided with Wi-Fi enable memory card such that the user after taking the photo can transmit the photo image without the need to detach the Wi-Fi enable memory card from the digital camera.

Presently, an SD (Secure Digital) memory card is the most prevalent. In application, the user can conduct a single operation with respect to an accessor at a give time. Due to these reasons, the accessor is generally called the "Master" and it can conduct a single operation to the photo taken by the digital camera at a given time; or the Master transmits the photo image to a Wi-Fi element via which the photo image is transmitted to a desired blog in the Internet.

As described above, in case the user sets the digital camera to transmit the photo image immediately after taking the same, the moment the user has finished taking a photo, the memory card starts transmission of the image data via the Wi-Fi communication element. During the transmission of the image data, the memory card and the Wi-Fi communication element are related to each other one by one operating condition, i.e., the image capturing unit of the digital camera is unable to conduct storing data into or retrieving data from the memory card. In other words, the user must wait till the completion of transmission of the image data, only then he or she can use the digital camera again, i.e., continue shooting with the digital camera. Such a situation adversely prevents the smooth shooting operation of the photo and discomforts the user of the digital camera.

SUMMARY OF THE INVENTION

Therefore, the object of the present invention is to provide a multimedia storage card system equipped with a dynamic switch such that the memory card simultaneously allow access of a plurality of accessors, thereby permitting data storing into and data retrieving operation from the memory card.

The multimedia storage card system according to the present invention includes a memory card, a dynamic switch, a first accessor and a second accessor. The dynamic switch is coupled electrically and communicatively to the memory card. The first accessor is coupled electrically and communicatively to the dynamic switch for accessing the memory card, thereby storing data into and retrieving data from the memory card. The second accessor is coupled electrically and communicatively to the dynamic switch in such a manner that upon receipt of a first access signal transmitted from the second accessor, the dynamic switch determines whether the first accessor is in an idle condition or not. Upon detecting that the first accessor is in the idle condition, the dynamic switch is switched to so as to in communication link with the second accessor, thereby transmitting the first access signal to the memory card and enabling the second accessor to access the memory card in order to store data into and retrieving data from the memory card.

In one embodiment of the present invention, the dynamic switch includes a register such that upon the dynamic switch is switched to the second accessor, the first accessor transmits a second access signal to the dynamic switch so as to permit temporarily storing the second access signal in the register and simultaneously detecting whether the second accessor is an interrupted condition. Upon detecting that the second accessor is at the interrupted condition, the dynamic switch is switched to the first accessor and simultaneously transmitting the second access signal from the register to the memory card, thereby enabling the first accessor to access the memory card in order to store data into and retrieving data from the memory card.

In the present invention, the first accessor is a host of an electronic device which preferably can be, but is not limited to be, a digital camera, a digital photoframe or a card reader.

In one embodiment of the present invention, said second accessor is selected from a group consisting of MCU (Micro Control Unit) and CPU (Central Control Unit).

Preferably, said memory card is a SD (Secure Digital) memory card.

When compared to the prior art media card system, a dynamic switch is employed in the multimedia storage card system of the present invention to detect the conditions of the first and second accessors. Therefore, during smooth data storing into and data retrieving operation of the first accessor relative to the memory card, the second accessor can simultaneously conduct the same operation similar to that of the first accessor. In other words, when the multimedia storage card system of the present invention is implemented, the working operation of the apparatus is smooth.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENT

The feature of the present invention resides a multimedia storage card system, more particularly to a multimedia storage card system provided with a dynamic switch. In order to better understanding of the present invention, a few embodiments are illustrated in the following paragraphs, however the limitation scope of the invention should not be limited only thereto.

Figure 1:
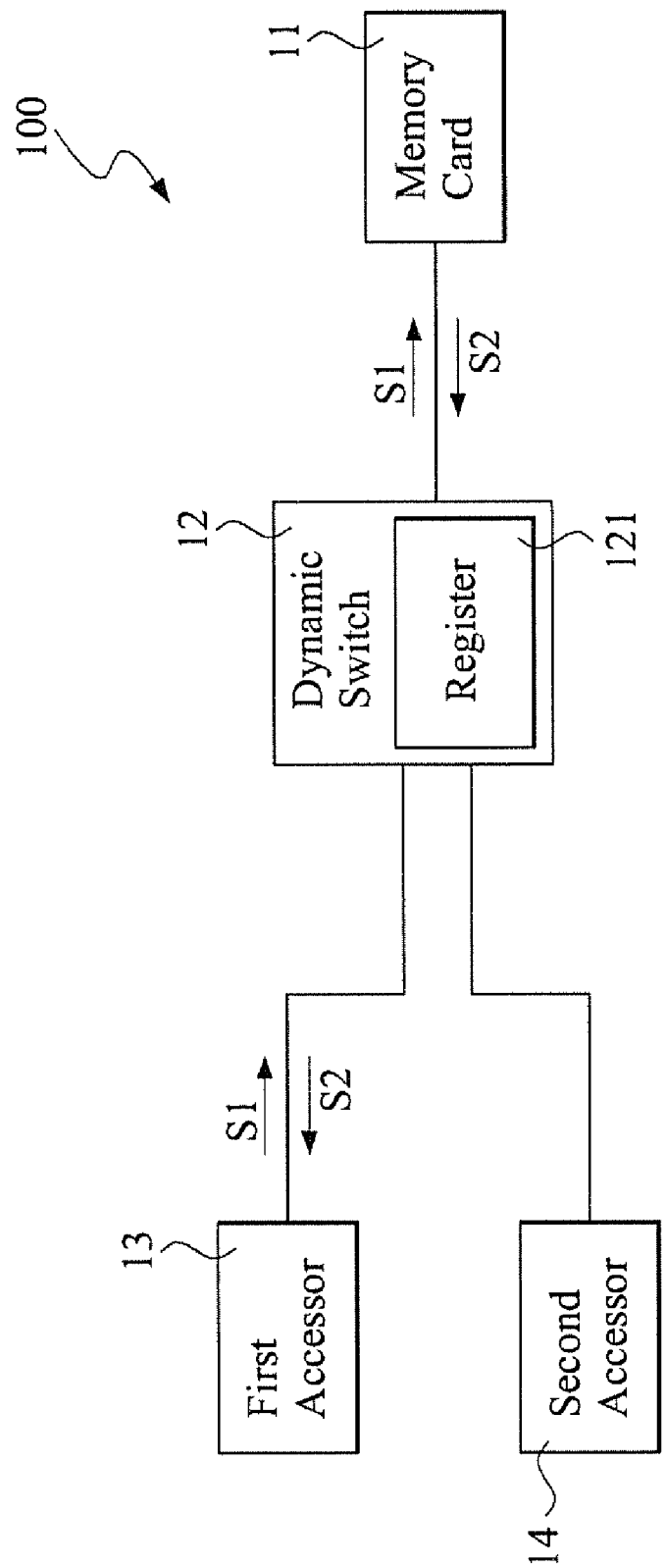
FIG. 1 shows a block diagram illustrating how a first accessor accesses a memory card in order to store data into and retrieving data from the memory card according to a multimedia storage card system of the present invention.
Figure 2:
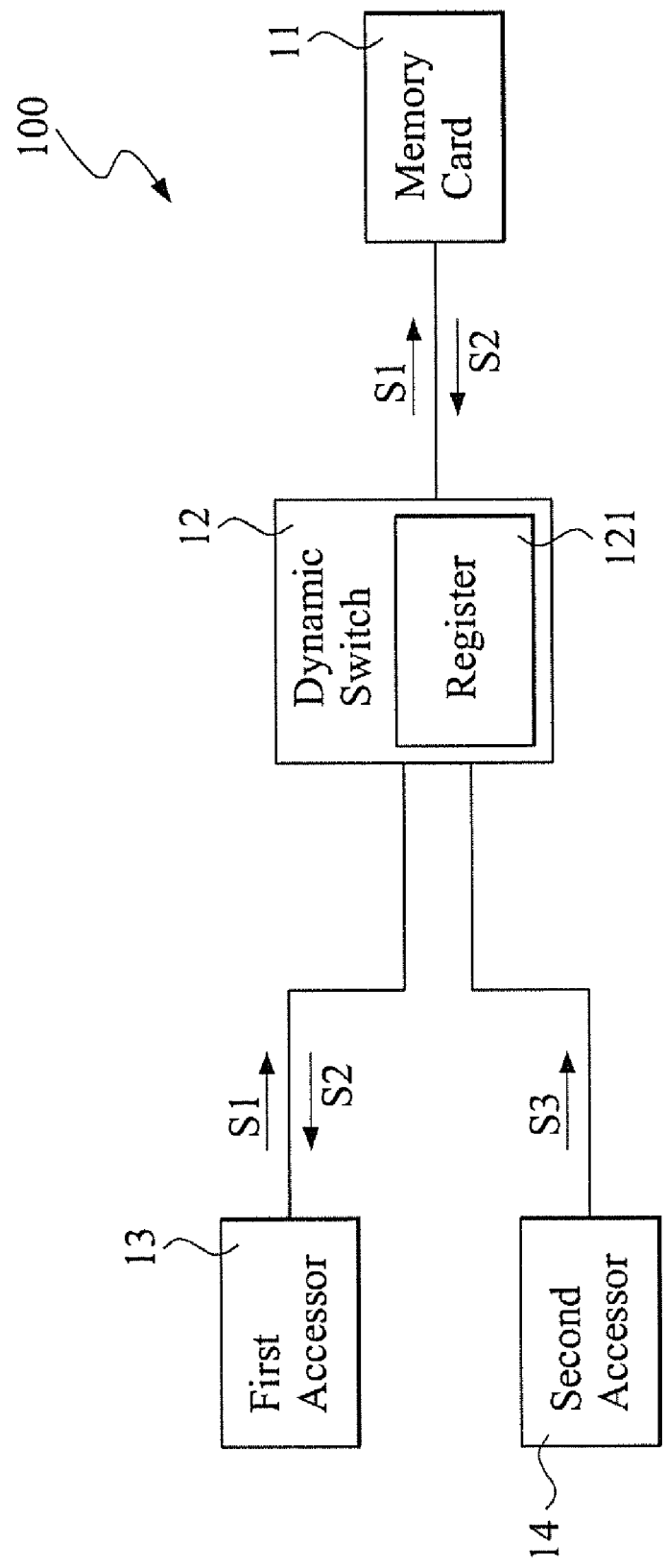
FIG. 2 shows a block diagram illustrating how a second accessor transmits a first access signal to a dynamic switch in the multimedia storage card system of the present invention.
Figure 3:
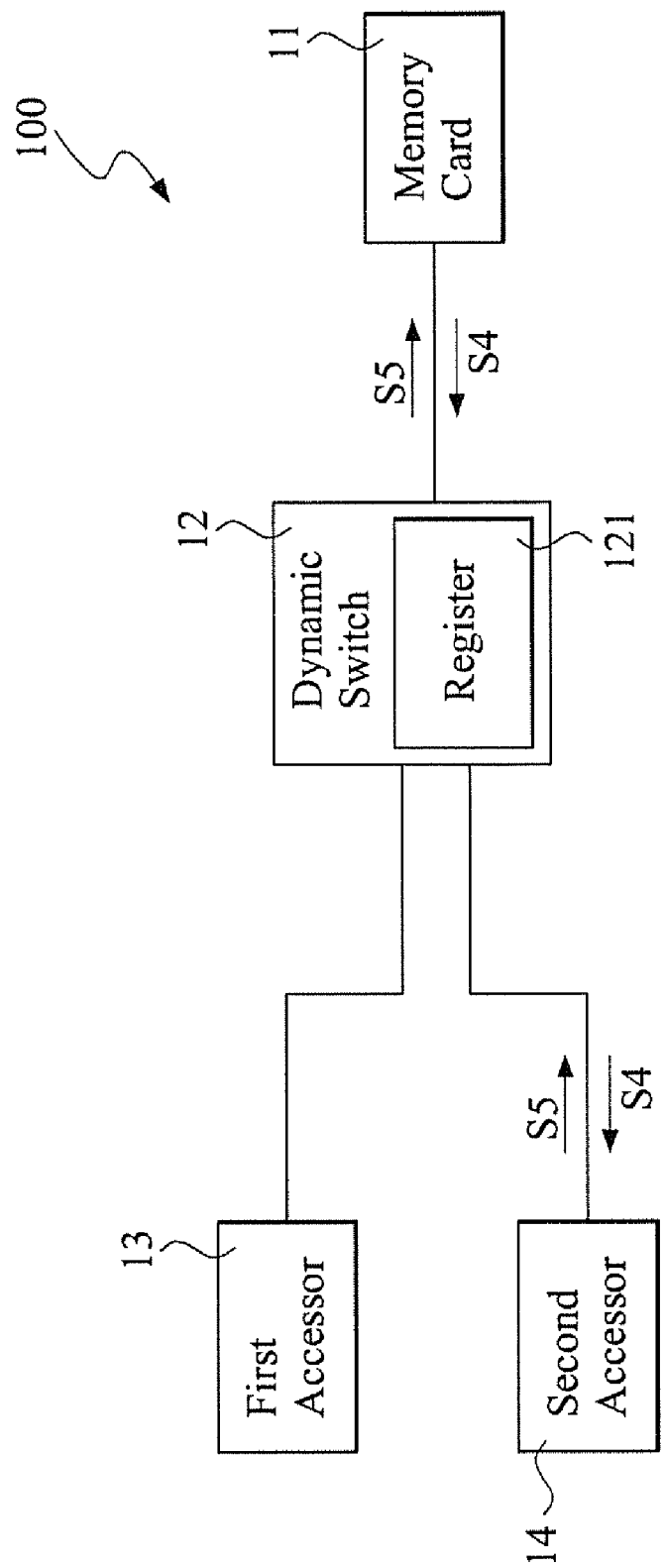
FIG. 3 shows a block diagram illustrating how the dynamic switch enables the second accessor to access the memory card in order to store data into and retrieving data from the memory card according to the multimedia storage card system of the present invention.

Referring to FIGS. 1, 2 and 3, wherein FIG. 1 shows a block diagram illustrating how a first accessor accesses a memory card in order to store data into and retrieving data from the memory card according to a multimedia storage card system of the present invention; FIG. 2 shows a block diagram illustrating how a second accessor transmits a first access signal to a dynamic switch in the multimedia storage card system of the present invention while FIG. 3 shows a block diagram illustrating how the dynamic switch enables the second accessor to access the memory card in order to store data into and retrieving data from the memory card according to the multimedia storage card system of the present invention. As illustrated, the multimedia storage card system 100 of the present invention includes a memory card 11, a dynamic switch 12, a first accessor 13 and a second accessor 14.

The dynamic switch 12 is coupled electrically and communicatively to the memory card 11. The first accessor 13 is coupled electrically and communicatively to the dynamic switch 12 for accessing the memory card 11, thereby permitting storing data into and retrieving data from the memory card 11. The second accessor 14 is coupled electrically and communicatively to the dynamic switch 12. To be more specific, in one embodiment of the present invention, the first accessor 13 is a host of an electronic device which preferably can be, but is not limited to be, a digital camera, a digital photoframe or a card reader. In case the multimedia storage card system of the present invention is used in a digital camera, a photo processor serves as the first accessor 13 such that after taking a photo, the latter is stored into the memory card 11 as a signal S1 or retrieve a signal S2 from the memory card 11 to display the photo. The second accessor 14 can be selected from a group consisting of MCU (Micro Control Unit) and CPU (Central Control Unit). In addition, the second accessor 14 also can be a wireless communication element (Wireless Fidelity: Wi-Fi) while a SD (Secure Digital) memory card serves as the memory card 11, which can conduct a single operation only relative to a respective accessor at a given time, i.e., either storing data or retrieving data therefrom.

Upon receipt of a first access signal S3 transmitted from the second accessor 14, the dynamic switch 12 will check and determines whether the first accessor 13 is in an idle condition or not. Upon detecting the first accessor 13 is in the idle condition, the dynamic switch 12 is switched to so as to be in communication link with the second accessor 14, thereby transmitting the first access signal S3 to the memory card 11 and simultaneously enabling the second accessor 14 to access the memory card 11 in order to store data into and retrieving data from the memory card 11. For instance, the memory card 11 utilizes a signal S4 to transmit the recently taken photo. In one embodiment of the present invention, the idle condition means that the first accessor 13 is not under any command or operation.

Figure 4:
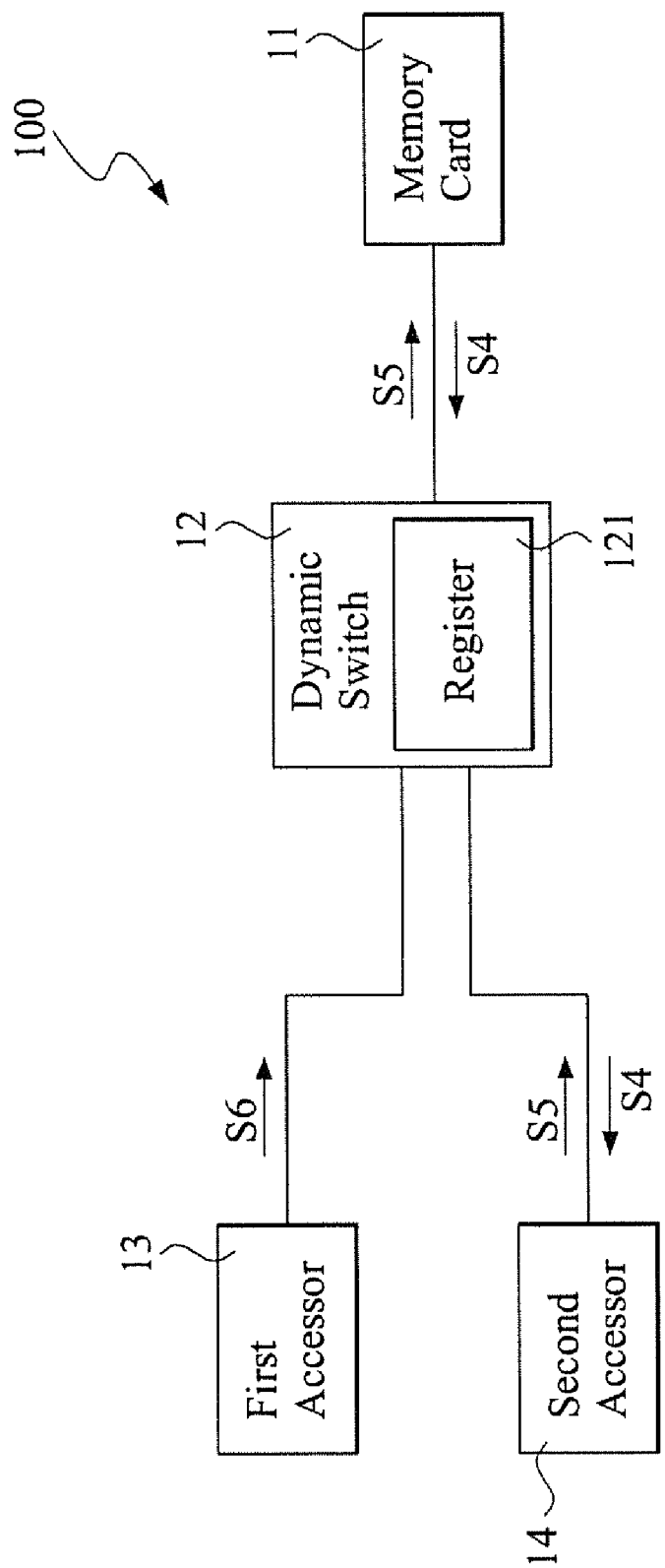
FIG. 4 shows a block diagram illustrating how the second accessor transmits a second access signal to the dynamic switch in the multimedia storage card system of the present invention.
Figure 5:
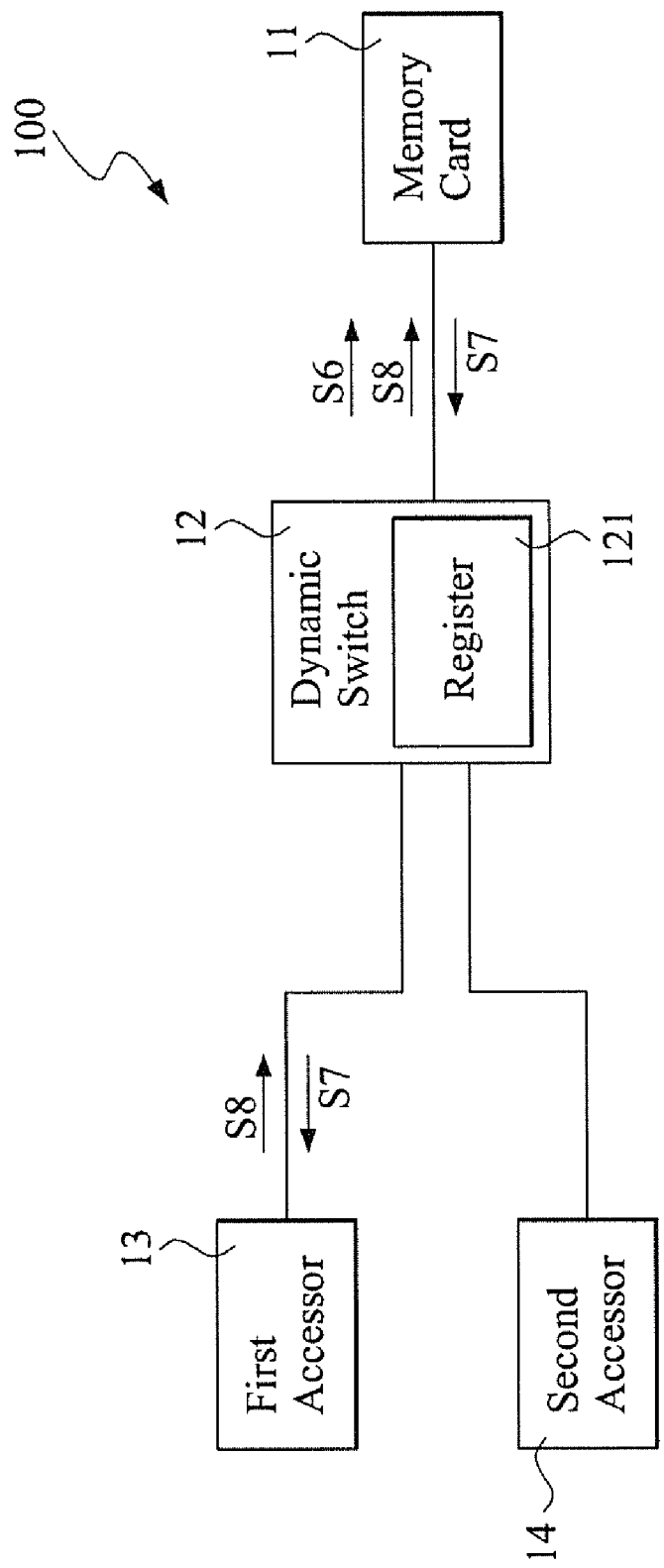
FIG. 5 shows a block diagram illustrating how the dynamic switch is switched to the first accessor in the multimedia storage card system of the present invention.

Referring to FIGS. 4 and 5, wherein FIG. 4 shows a block diagram illustrating how the second accessor 14 transmits a second access signal to the dynamic switch 12 in the multimedia storage card system of the present invention and FIG. 5 shows a block diagram illustrating how the dynamic switch 12 is switched to the first accessor 13 in the multimedia storage card system of the present invention. In order to permit the first accessor 13 to conduct smooth data storing into and data retrieving from the memory card 11, the dynamic switch 12 further includes a register 121 such that upon the dynamic switch 12 is switched to the second accessor 14, the first accessor 13 transmits a second access signal S5 to the dynamic switch 12 so as to permit temporarily storing the second access signal S5 within the register 121 and simultaneously detecting whether the second accessor 14 is an interrupted condition. Upon detecting that the second accessor 14 is at the interrupted condition, the dynamic switch 12 is switched to the first accessor 13 and simultaneously transmitting the second access signal S5 from the register 121 to the memory card 11, thereby enabling the first accessor 13 to access the memory card 11 in order to store data into and retrieving data from the memory card 11. For instance, a reading signal S6 is retrieved from the memory card 11 for displaying action. In this embodiment, the interrupted condition means that the second accessor 14 is not under any command or operation. Alternately, the interrupted condition means that the second accessor 14 is in a condition immediately after transmission of any one of the plurality data packets. When the second accessor 14 is the interrupted condition, the first accessor 13 has the priority to access the memory card 11 in order to store data into and retrieving data from the memory card 11. The smooth data storing into or data retrieving operation of the first accessor 13 relative to the memory card 11 does not affect the data storing into or data retrieving operation of the second accessor 14 relative to the memory card 11.

When compared to the prior art media card system, the dynamic switch 12 is employed in the multimedia storage card system of the present invention to detect the conditions of the first and second accessory 13, 14. Therefore, during smooth data storing into and data retrieving operation of the first accessor 13 relative to the memory card 11, for instance in a Wi-Fi enabled digital camera, the first accessor 13 may serve as a photo processor of the Wi-Fi enable digital camera. In the event, when the second accessor 14 serves as the Wi-Fi communication element, the latter merely conduct the transmission of the image data only when the photo processor is at the idle condition relative to the memory card 11. When the user is taking photo with the use of the digital camera, the dynamic switch 12 will disconnect the communication link between the Wi-Fi communication element and the memory card 11 in order to enable the photo processor to access the memory card 11. In other words, when the multimedia storage card system of the present invention is implemented or due to switch-on of the Wi-Fi communication element in the digital camera, the photo taking operation of the digital camera is not delay.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A multimedia storage card system comprising:
a memory card;

a dynamic switch coupled electrically and communicatively to said memory card;

a first accessor coupled electrically and communicatively to said dynamic switch for accessing said memory card, thereby storing data into and retrieving data from said memory card; and a second accessor coupled electrically and communicatively to said dynamic switch;

wherein, upon receipt of a first access signal transmitted from said second accessor, said dynamic switch determines whether said first accessor is in an idle condition or not and upon detecting said first accessor being in said idle condition, said dynamic switch being switched to so as to in communication link with said second accessor, thereby transmitting said first access signal to said memory card and enabling said second accessor to access said memory card in order to store data into and retrieving data from said memory card.

2. The multimedia storage card system according to claim 1, wherein said dynamic switch includes a register such that upon said dynamic switch is switched to said second accessor, said first accessor transmitting a second access signal to said dynamic switch so as to permit temporarily storing said second access signal in said register and simultaneously detecting whether said second accessor is an interrupted condition, upon detecting said second accessor being at said interrupted condition, said dynamic switch being switched to said first accessor and simultaneously transmitting said second access signal from said register to said memory card, thereby enabling said first accessor to access said memory card in order to store data into and retrieving data from said memory card.

3. The multimedia storage card system according to claim 1, wherein the first accessor is a host of an electronic device.

4. The multimedia storage card system according to claim 1, wherein the second accessor is selected from a group consisting of MCU (Micro Control unit) and CPU (Central Processing Unit).

5. The multimedia storage card system according to claim 1, wherein said memory card is a SD (Secure Digital) memory card.

* * * * *